Figure 1:
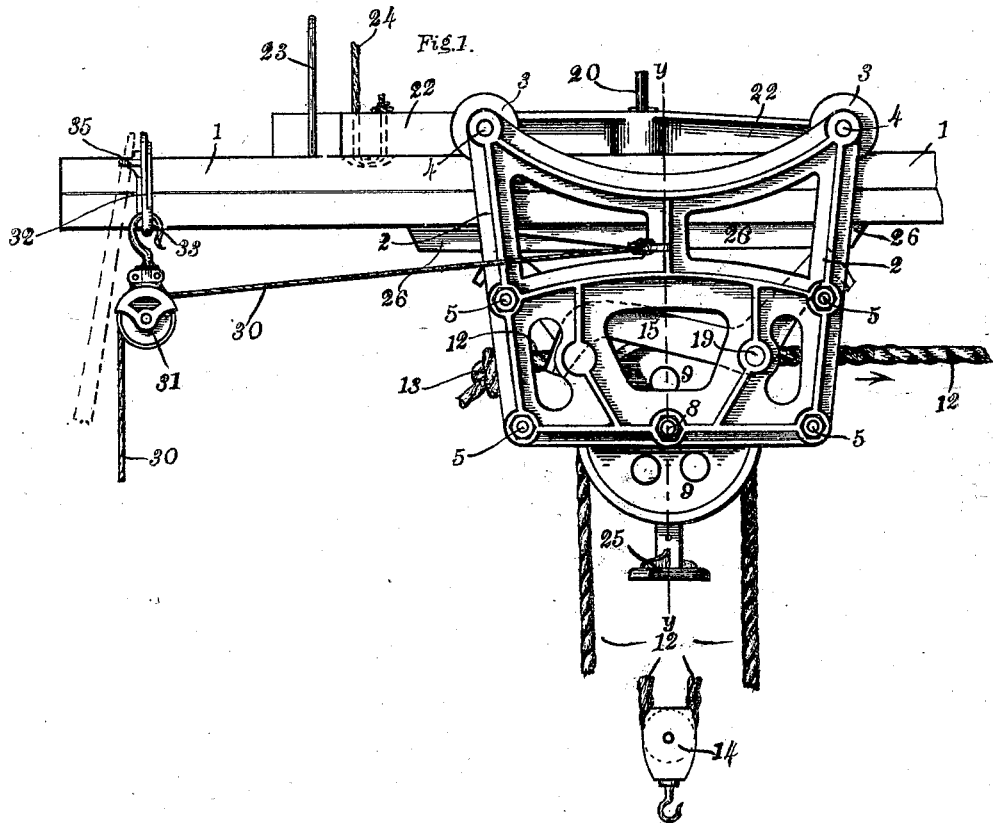

(No Model.) 2 Sheets—Sheet 1.

W. G. RICKER.
HAY CARRIER.

No. 554,311. Patented Feb. 11, 1896.

Witnesses:
Thomas Durant.
Wallace Murdoch.

Inventor:
Wentworth G. Ricker
by Church & Church
his attys.

(No Model.) 2 Sheets—Sheet 2.
W. G. RICKER.
HAY CARRIER.
No. 554,311. Patented Feb. 11, 1896.
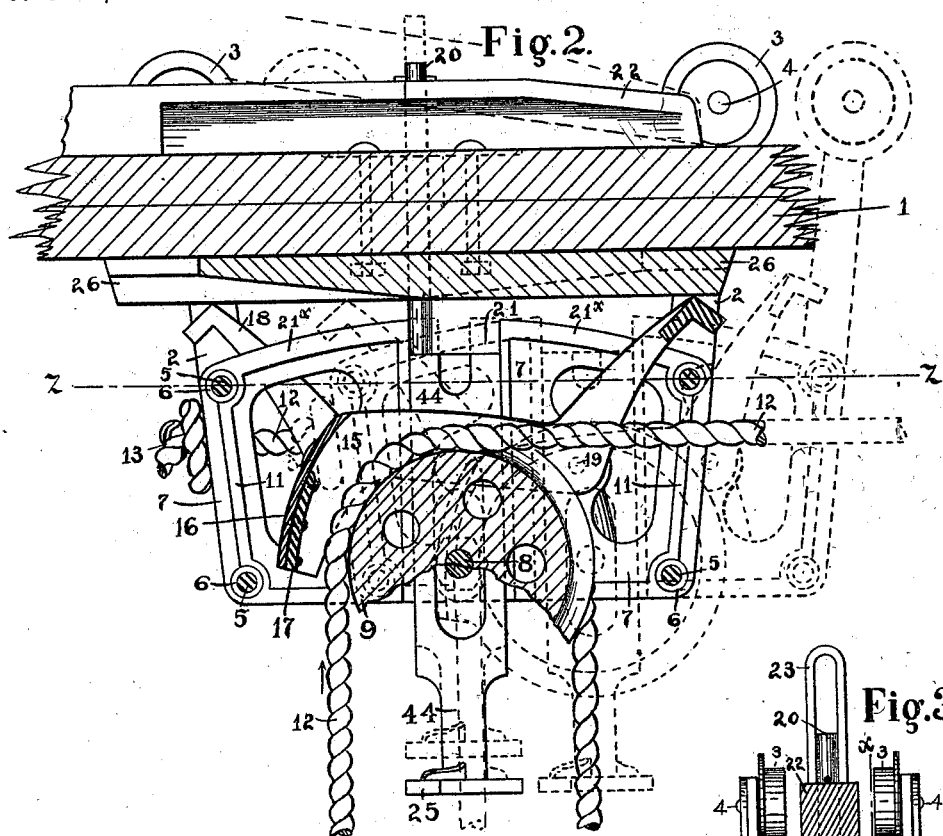
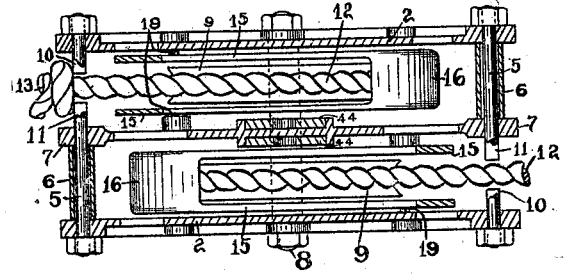
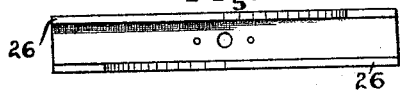
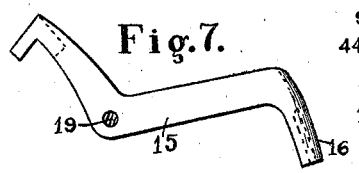
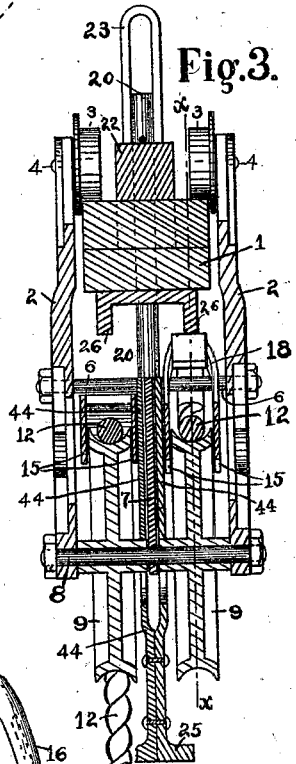
Witnesses:
Grace A. Roda.
Silas Willard Rich.
Inventor
Wentworth G. Ricker
by Church & Church
his Atty's.

UNITED STATES PATENT OFFICE.

WENTWORTH G. RICKER, OF ROCHESTER, NEW YORK.

HAY-CARRIER.

SPECIFICATION forming part of Letters Patent No. 554,311, dated February 11, 1896.

Application filed February 23, 1895. Serial No. 539,450. (No model.)

*To all whom it may concern:*

Be it known that I, WENTWORTH G. RICKER, of Rochester, in the county of Monroe and State of New York, have invented certain new and useful Improvements in Hay-Carriers; and I do hereby declare the following to be a full, clear, and exact description of the same, reference being had to the accompanying drawings, forming a part of this specification, and to the reference-numerals marked thereon.

My present invention has for its object to provide an improved hay-carrier consisting of few parts so as to be cheaply and easily constructed, and not liable to get out of order or be broken by ordinary use, and, further, to provide one that may be readily reversed or moved in opposite directions without changing the draft-rope; and to these and other ends it consists in certain improvements in construction and combinations of parts, all as will be hereinafter fully described and the novel features pointed out in the claims at the end of this specification.

In the drawings, Figure 1 is a side elevation of a carrier constructed in accordance with my invention; Fig. 2, a longitudinal sectional view on the line $xx$ of Fig. 3; Fig. 3, a cross-sectional view on the line $yy$ of Fig. 1; Fig. 4, a horizontal sectional view on the line $zz$ of Fig. 2; Fig. 5, a perspective view of the removable track-hook; Fig. 6, a bottom view of the rope-clamp-releasing devices secured to the bottom side of the track; Fig. 7, a plan view of one of the rope-clamps.

Similar reference-numerals in the several figures indicate similar parts.

The track or way on which the carrier is adapted to travel (indicated by 1 in the drawings) may be of any suitable construction, and the carrier-frame is composed, generally, of the two side frames or pieces 2 2, each having at its upper edge the flanged supporting-wheels 3 3, mounted upon suitable studs 4, and the side frames are connected beneath the way or track by means of transversely-extending bolts 5, upon which are arranged spacing-sleeves 6 holding midway between said side pieces a central plate or casting 7; also extending through the side pieces is a bolt 8 upon which are mounted the wheels 9 arranged on opposite sides of the central dividing-plate and held from movement by said plate and the sides, as shown particularly in Fig. 4. The side frames 2 are each provided at one end with a short rib or flange 10 adapted to co-operate with a flange or rib 11 on the central plate, the narrowed throats formed by said flanges being arranged at opposite ends of the carrier, as shown, and for the purpose of engaging the knot on the end of the hoisting or draft rope 12. This draft-rope, as stated, is provided at one end with a knot 13 or any other suitable stop or wider portion incapable of passing through the throat and extends over the pulley 9 next said throat and downward in a loop in which the lifting-pulley 14 is mounted, thence upward and over the other pulley 9 in the opposite direction, and outward substantially parallel with the track, and to this end the draft is applied as usual.

Each of the rope-pulleys 9 is provided with a rope-clamp constructed of a single casting, the sides 15 of which straddle the pulleys, and at the end is an engaging portion 16, to the inner side of which is preferably attached a shoe 17, while the other is preferably somewhat beveled at 18 and projects in close proximity to the under side of the track. The sides of these rope-clamps are preferably provided with studs or gudgeons 19, journaled in apertures formed in the side plates and central plate respectively, the engaging end having the shoe adapted to engage the rope on the pulley about level with or slightly below the center.

It will be understood that the rope-clamping devices of the rope-pulleys are in reversed position, and that on the side from which the rope extends down in the form of a loop, so that when the clamps are not held out of engagement they will clamp the rope to the pulleys, and by reason of the relation of their pivots and engaging faces the weight of the sling or fork will cause their tight engagement and said sling or fork will be sustained independently of the draft, as shown in dotted lines in Fig. 2.

I have shown a portion of the track to which the load is to be elevated, and operating preferably through the track is a movable stop or bolt 20, the lower end being adapted to engage a recess 21 in the central plate of the carrier having inclines $21^\times$ on opposite sides, while the upper end is operated upon by a lever 22 resting loosely upon the track, its movable end being guided by a staple or similar contrivance 23 and adapted to be raised by a rope 24, the opposite end of the lever resting on the track as a fulcrum. Sliding upon the central plate is a stop-release or tripping device 44, consisting in the present instance of two plates arranged on opposite sides of said central plate and guided thereon, their upper ends being adapted to engage the lower end of the bolt or stop 20, while their lower ends extend downward and are connected beneath the carrier in the form of a head 25, against which the sling-pulley is adapted to strike as the load is elevated, raising the stop-bolt and permitting the carrier to move away from the track-stop.

The rope-clamp-releasing devices consist of a casting secured to the lower side of the track in proximity to the stop or bolt, preferably having the two ribs or rails 26 with which the upper ends of the rope-clamps engage when the carrier is held by the stop, removing the engaging ends or shoes from the rope on the pulley.

In normal position, and while the load is being raised to the carrier, the parts are in the position shown in Fig. 1, the sling or fork is attached to the pulley in the loop of the draft-rope and the carriage is retained from movement by the stop, the rope-clamps being held out of engagement, as described, by the releasing rails or projections 26 on the track. As soon as the pulley engages the head 25 of the stop-release the latter will be moved up, pushing up the bolt until its lower end is disengaged from the recess in the central plate and the draft continuing will move the carrier and its load along the way, the rope being gripped on both pulleys and securely held as soon as the carrier leaves the stop, the upper ends of the clamps moving away from the ribs 26, as shown particularly in dotted lines in Fig. 2. The carrier, after being moved to the end of the track or way, is returned by a return-rope 30 connected to the center of the carrier and passing over the pulley 31, which is supported upon a hanger 32, constructed as shown in Fig. 5, having an eye 33 for the hook of the pulley, the depending end 34 engaging the opposite side of the track and the aperture 35, the latter serving for the application of the end of a pole or fork by which the hanger may be removed from one side of the stop to the other, as in dotted lines in Fig. 1, without the necessity of the operator climbing to the track for the purpose. When the carrier is returned to the stop from either side the inclines $21^\times$ on the central plate will raise the stop-bolt and allow it to drop into the recess 21, the ends of the rope-clamps engaging the ribs 26 and releasing-rope and allowing the pulley 14 to descend to the wagon beneath it.

It will be understood that when it is desired to run the carrier in the opposite direction it is only necessary to allow the end of the rope to which the draft was formerly attached to run through the carrier and knot the end or apply a stop thereto to engage the flanges 10 and 11, as described, the draft then being attached to the end of the rope shown as having the knot or stop 13.

By my present construction I am enabled to simplify the parts and render the device compact, both the rope-pulleys being mounted on a single bolt, and the central plate or septum serves to separate the pulleys and as well to serve as the engaging medium for the stop or bolt. The central bolt, it will be observed, passes through the aperture in the stop-releasing device 44 and the extensions or hubs of the pulleys serve to limit the downward movement of the latter.

I claim as my invention—

1. In a carrier, the combination with the two side frames having the supporting-wheels at their upper ends, the central plate, the connecting-bolts, and the central bolt, of the two rope-pulleys mounted upon the central bolt on opposite sides of the central plate, and the rope extending over said pulleys in opposite directions, substantially as described.

2. In a carrier, the combination with the frame, the central plate having the recess for the stop, the two pulleys on opposite sides of said plate, a rope-clamp for each pulley, and the draft-rope extending over said pulleys in opposite directions, of the track, the rope-clamp-releasing projections thereon, and the movable track-stop, substantially as described.

3. In a carrier, the combination with the frame, the central plate having the recess, the movable stop-release on said plate, the two rope-pulleys arranged side by side, of the track or way, the vertically-movable stop-bolt thereon, the rope extending over the pulleys in opposite directions, and the pulley on the rope adapted to engage the stop-release and operate it, substantially as described.

4. In a carrier, the combination with the frame, the two rope-pulleys therein arranged side by side, the two rope-clamps engaging the ropes on the pulleys on opposite sides, and having the upper ends extending in proximity to the track, of the track, the stop thereon, the sliding releasing-plate on the carrier, the rope passing over the pulleys in opposite directions, and the pulley in the loop of the rope, substantially as described.

5. In a carrier, the combination of the two side frames the central plate, the connecting-bolts and the central bolt, of the two rope-pulleys mounted upon the central bolt on opposite sides of the central plate, the two rope-clamps one for each pulley pivoted in the side and central plates respectively, and having the upper end extending in proximity to the track, the clamp-releasing projections on the track, the draft-rope extending over the pulleys in opposite directions, and the pulley in the loop of said rope, substantially as described.

6. In a carrier, the combination with the frame having supporting-wheels, the central plate having the recess for engaging a track-stop, the sliding stop-release extending on opposite sides of the central plate and having the aperture therein, the central bolt, the pulleys thereon on opposite sides of the central plate, the track, and the stop thereon engaging the central plate, substantially as described.

7. In a carrier, the combination with the side frames having the ribs 10, and the track-wheels, and the central plate having the ribs 11, of the two pulleys arranged side by side on opposite sides of the central plate, the rope passing over the pulleys in opposite directions, and the pulley supported in the loop between the pulleys, substantially as described.

8. In a carrier, the combination with the side and central plates, the two pulleys side by side and on opposite sides of the central plate, of the two reversed rope-clamps, one for each pulley, each pivoted above the center of its pulley and having sides 15, the engaging portion 16, and the upper end projecting in proximity to the track, the track, the engaging projections thereon for co-operating with the clamps, and the rope extending over the pulleys in opposite directions with a loop between, substantially as described.

9. In a carrier, the combination with a frame, and a rope-pulley, of a rope-clamp pivoted above the center of the pulley and consisting of the sides 15, the rope-engaging portion 16, and the upwardly-projecting end, substantially as described.

10. The combination with the track and the reversible carrier movable thereon, of the movable track-hook having two apertures on the side, one opening vertically for the engagement of a pole, and one horizontally for a pulley-hook, a return-rope connected to the carrier, and a pulley having a hook attached to the horizontal opening in the track-hook, substantially as described.

WENTWORTH G. RICKER.

Witnesses:
F. F. CHURCH,
G. A. RODA.